United States Patent [19]
Bastian et al.

[11] 3,888,829
[45] June 10, 1975

[54] N,N'-BIS[3-HYDROXY-2-(3,4-DIHYDROXY-PHENYL)-1-PROPYL]-ALIPHATIC-DIAMINES

[75] Inventors: Jean-Michel Bastian, Therwil; Klaus Hasspacher, Riehen, both of Switzerland

[73] Assignee: Sandoz, Inc., Basel, Switzerland

[22] Filed: June 20, 1972

[21] Appl. No.: 264,422

[30] Foreign Application Priority Data
June 25, 1971 Switzerland.......................... 9347/71
Aug. 26, 1971 Switzerland....................... 12494/71

[52] U.S. Cl. ...... 260/570.6; 260/473 S; 260/501.18; 260/501.19; 260/570.5 P; 424/316; 424/330
[51] Int. Cl. .......................................... C07c 91/16
[58] Field of Search....... 260/570.6, 501.19, 501.18; 424/330

[56] References Cited
UNITED STATES PATENTS
3,329,709   7/1967   Schmid et al. ................... 260/570.6
3,804,899   4/1974   Ebnother et al. ................. 260/570.6

*Primary Examiner*—R. V. Hines
*Attorney, Agent, or Firm*—Gerald D. Sharkin; Robert S. Honor; Thomas O. McGovern

[57] ABSTRACT

This invention provides new compounds of the formula:

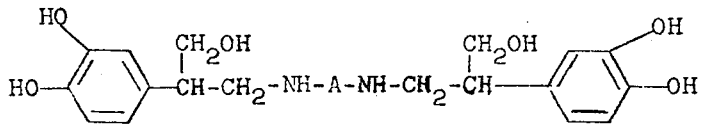

wherein A is a — $(CH_2)_n$ — group,
wherein $n$ is an integer from 2 to 10, or a

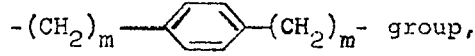

wherein $m$ is 2 or 3,
and acid addition salts thereof.

The compounds are bronchodilators useful in the treatment of bronchospasms.

8 Claims, No Drawings

N,N'-BIS[3-HYDROXY-2-(3,4-DIHYDROXY-PHENYL)-1-PROPYL]-ALIPHATIC-DIAMINES

IMPROVEMENTS IN OR RELATING TO ORGANIC COMPOUNDS

This invention relates to new N,N'-bis(3-hydroxy-2-phenyl-1-propyl)diamine derivatives.

In accordance with the invention there are provided new compounds of formula I,

[Structure of formula I: 3,4-dihydroxyphenyl-CH(CH₂OH)-CH₂-NH-A-NH-CH₂-CH(CH₂OH)-3,4-dihydroxyphenyl]

wherein A is a —$(CH_2)_n$— group,
wherein $n$ is an integer from 2 to 10,
or a $-(CH_2)_m$—〈phenylene〉—$(CH_2)_m-$ group, wherein $m$ is 2 or 3,
and acid addition salts thereof.

Further, in accordance with the invention a compound of formula I may be obtained by a process comprising a. converting the ether groups into hydroxy groups in a compound of formula IIa,

[Structure of formula IIa]

wherein
A is as defined above, and
$R_1$ is methyl, ethyl or benzyl, or b. debenzylating by hydrogenation a compound of formula IIb,

[Structure of formula IIb]

wherein
A is as defined above,
$R_2$ is hydrogen or benzyl, and
$R_1{'}$ is benzyl, or, when $R_2$ is benzyl, is hydrogen or benzyl, and, where an acid addition salt is required, converting the resulting compound of formula I into such salt.

When A in the compounds of formula I denotes an alkylene chain, this preferably contains 4 to 8, especially 6 carbon atoms. When A in the compounds of formula I denotes a dialkylene-p-phenylene chain, the alkylene groups thereof preferably contain 2 carbon atoms.

Process variant (a) may be carried out by the usual methods for ether splitting. Thus, for example, a compound of formula IIa may be allowed to react with a Lewis acid, e.g., boron tribromide or aluminium chloride, in an inert organic solvent, e.g., a halogenated hydrocarbon such as methylene chloride or carbon tetrachloride, or an aromatic hydrocarbon such as toluene or benzene, suitably at $-80°$ to $+70°C$, preferably at the lower end of the range, or a compound of formula IIa may be treated for a short time with a strong mineral acid, e.g., hydrobromic or hydriodic acid, optionally at an elevated temperature, e.g., at approximately 20° to 100°C, or the hydrochloride, hydrobromide or hydriodide of an organic base such as aniline or pyridine is allowed to act upon a compound of formula IIa at an elevated temperature, e.g., about 20° to 100°C.

The hydrogenation in accordance with process variant (b) may, for example, be effected in the presence of a catalyst, preferably a palladium catalyst, conveniently in an inert solvent, e.g., ethyl acetate, or a lower alkanol such as methanol or ethanol. Suitable temperatures are from 20° to 100°C, and suitable hydrogen pressures are from 1 to 200 atmospheres.

The compounds of formula I may be isolated from the reaction mixture and purified in known manner; the free bases may be converted into acid addition salts and acid addition salts into free bases in conventional manner.

The starting materials may, for example, be obtained as follows:

A compound of formula II,

[Structure of formula II]

wherein $R_1$, $R_2$ and A are as defined above, may, for example, be obtained by reducing a compound of formula III,

[Structure of formula III]

wherein
$R_1$, $R_2$ and A are as defined above, and
$R_3$ is lower alkyl,
with a metal hydride or complex metal hydride. The reduction may, for example, be effected in an inert solvent, e.g., an ether such as diethyl ether, tetrahydrofuran, dioxane or dimethoxyethane, with lithium aluminium hydride or aluminium hydride, and is preferably effected at a temperature from room temperature to approximately 100°C, and the reaction time may range between ½ and 5 hours.

A compound of formula IIc,

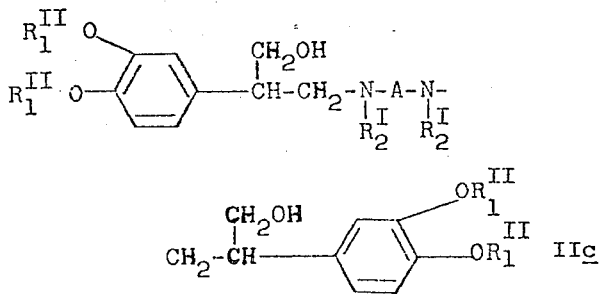

wherein
A is as defined above,
$R_1''$ is methyl or ethyl, and
$R_2'$ is benzyl,
which may be obtained from the reaction, may subsequently be converted into a compound of formula IIa in which $R_1$ is methyl or ethyl, for example by hydrogenolytic debenzylation, as described in process variant (b), or into a compound of formula IIb in which $R_1'$ is hydrogen and $R_2$ is benzyl by conversion of the ether groups into hydroxy groups, as described in process variant (a).

A compound of formula III may, for example, be obtained by adding a compound of formula IV,

wherein $R_2$ and A are as defined above,
to a compound of formula V,

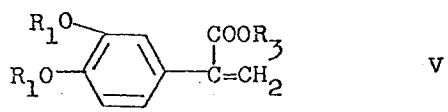

wherein $R_1$ and $R_3$ are as defined above.

The reaction may, for example, be effected at a temperature of 20° to 100°C. It is preferred to use about twice the molar quantity of the compound of formula V relative to the compound of formula IV. The reaction may be effected in an inert solvent, e.g., a lower alkanol.

Insofar as the production of the starting materials is not particularly described, these are known or may be produced in accordance with known processes or in a manner analogous to the processes described herein or to known processes.

The compounds of formula I exhibit interesting pharmacodynamic properties and are therefore indicated for use as medicaments.

The compounds of formula I are useful because they possess pharmacological activity in animals. In particular, the compounds are useful as bronchodilators in the treatment of obstructive respiratory passage disorders, e.g. in bronchial asthma, as indicated by tests in cats in which inhibition of bronchospasms induced by histamine is observed on intravenous administration of 0.0002 to 0.01 mg/kg animal body weight, of the compound.

For the above-mentioned use, the dosage administered will, of course, vary depending upon the compound employed, mode of administration and treatment desired. However, satisfactory results are obtained when administered at a daily dosage of from about 0.0002 to 0.15 mg/kg animal body weight, suitably given in divided doses 2 to 3 times a day or in sustained release form. For the larger mammals, the total daily dosage is in the range from about 0.002 to 10 mg. The p.o. dosage indicated is from about 0.03 to 0.15 mg/kg animal body weight, and the total daily dosage for the larger mammals is from about 2 to 10 mg. Unit dosage forms suitable for oral administration comprise from about 0.6 to 5 mg of the compound admixed with a solid or liquid pharmaceutical carrier or diluent.

1,4-Bis{2-[3-hydroxy-2-(3,4-dihydroxyphenyl)-1-propylamino]ethyl}benzene and N,N'-bis[3-hydroxy-2-(3,4-dihydroxyphenyl)-1-propyl]hexamethylenediamine have particularly interesting properties.

The compounds of formula I may be administered in pharmaceutically acceptable acid addition salt form. Such salts possess the same order of activity as the free bases and are readily prepared in conventional manner. Suitable such salt forms include organic acid salts such as the fumarate, tartrate and benzene-sulphonate, and mineral acid salts such as the hydrochloride, hydrobromide and sulphate.

The invention also provides a pharmaceutical composition comprising a compound of formula I, in free base or pharmaceutically acceptable acid addition salt form, in association with a pharmaceutical carrier or diluent. Such compositions may be prepared in conventional manner. The invention also provides an inhalation spray composition comprising approximately 1 percent of a compound of formula I, in free base or pharmaceutically acceptable acid addition salt form, and a pharmaceutical carrier or diluent suitable for inhalation.

In the following non-limitative examples all temperatures are indicated in degrees centigrade.

EXAMPLE 1

N,N'-Bis[3-hydroxy-2-(3,4-dihydroxyphenyl)-1-propyl]hexamethylenediamine 13.0 g of N,N'-bis[3-hydroxy-2-(3,4-dimethoxyphenyl)-1-propyl]hexamethylenediamine are dissolved in 150 cc of methylene chloride, and the solution is cooled to −75°. 30 g of boron tribromide in the form of a one molar solution in methylene chloride are slowly added dropwise with stirring at such a rate that the temperature does not exceed −70°. The mixture is allowed to warm slowly to room temperature, the solvent is distilled off after 5 hours, and the residue is heated at reflux for 1 hour with 100 cc of ethanol. After distilling off the ethanol, the residue is recrystallized from ethanol/ether. The dihydrobromide of the title compound has a M.P. of 86°–88°.

The starting material may be obtained as follows:

a. 12.8 g of 1,6-diaminohexane, 60.0 g of 3,4-dimethoxyatropic acid ethyl ester and 20 cc of ethanol are heated to 60° for 3 hours. After distilling off the solvent, the residue is taken up in ether, extraction is effected with 2 N hydrochloric acid, the hydrochloric acid extract is rendered alkaline with 2 N caustic soda solution while cooling, and extraction is then effected with ether. The ether phase is dried over sodium sulphate and concentrated by evaporation. The residue, crude N,N'-bis[2-carbethoxy-2-(3,4-dimethoxyphenyl)-1-ethyl]hexamethylenediamine, is converted into the naphthalene-1,5-disulphonate, which may be recrystallized from ethanol. M.P. 176°–179°.

b. 50 g of the N,N'-bis[2-carbethoxy-2-(3,4-dimethoxyphenyl)-1-ethyl]hexamethylenediamine, obtained in section (a), are reduced in 500 cc of tetrahydrofuran with 7.6 g of lithium aluminium hydride at 70° for 2 hours. After decomposing with a small amount of water, filtration, drying over sodium sulphate and concentrating by evaporation are effected. The residue, N,N'-bis[3-hydroxy-2-(3,4-dimethoxyphenyl)-1-propyl]hexamethylenediamine, is recrystallized from ethyl acetate. M.P. 92°–94°.

EXAMPLE 2

N,N'-Bis[3-hydroxy-2-(3,4-dihydroxyphenyl)-1-propyl]tetramethylenediamine

N,N'-Bis[3-hydroxy-2-(3,4-dimethoxyphenyl)-1-propyl]tetramethylenediamine is reacted in accordance with the process described in Example 1. The dihydrobromide of the title compound has a M.P. of 81°–85°.

The starting material may be obtained as follows:
a. The crude oily N,N'-bis[2-carbethoxy-2-(3,4-dimethoxyphenyl)-1-ethyl]tetramethylenediamine is produced in a manner analogous to that described in Example 1 (a), from 3,4-dimethoxyatropic acid ethyl ester and 1,4-diaminobutane, and
b. N,N'-bis[3-hydroxy-2-(3,4-dimethoxyphenyl)-1-propyl]tetramethylenediamine is obtained therefrom by reduction in a manner analogous to that described in Example 1 (b). M.P. of the dihydrochloride: 158°–160°.

EXAMPLE 3

N,N'-Bis[3-hydroxy-2-(3,4-dihydroxyphenyl)-1-propyl]ethylenediamine

N,N'-Bis[3-hydroxy-2-(3,4-dimethoxyphenyl)-1-propyl]ethylenediamine is reacted in accordance with the process described in Example 1. M.P. of the dihydrobromide of the title compound: 111° (decomp., from ethanol/ether).

The starting material may be obtained as follows:
a. Crude N,N'-bis[2-carbethoxy-2-(3,4-dimethoxyphenyl)-1-ethyl]ethylenediamine is produced in a manner analogous to that described in Example 1 (a) from 1,2-ethylenediamine and 3,4-dimethoxyatropic acid ethyl ester (M.P. of the dihydrochloride: 176°–179°, from ethanol), and
b. N,N'-bis[3-hydroxy-2-(3,4-dimethoxyphenyl)-1-propyl]ethylenediamine is obtained therefrom by reduction in a manner analogous to that described in Example 1 (b). M.P. of the dihydrochloride: over 250° (decomp.).

EXAMPLE 4

N,N'-Bis[3-hydroxy-2-(3,4-dihydroxyphenyl)-1-propyl]trimethylenediamine

N,N'-Bis[3-hydroxy-2-(3,4-dimethoxyphenyl)-1-propyl]trimethylenediamine is reacted in accordance with the process described in Example 1. M.P. of the dihydrobromide of the title compound: 78°–81°.

The starting material may be obtained as follows:
a. Crude oily N,N'-bis[2-carbethoxy-2-(3,4-dimethoxyphenyl)-1-ethyl]trimethylenediamine is produced in a manner analogous to that described in Example 1 (a) from 3,4-dimethoxyatropic acid ethyl ester and 1,3-diaminopropane, and
b. N,N'-bis[3-hydroxy-2-(3,4-dimethoxyphenyl)-1-propyl]trimethylenediamine is obtained therefrom by reduction in a manner analogous to that described in Example 1 (b). M.P. 100°–103°.

EXAMPLE 5

N,N'-Bis[3-hydroxy-2-(3,4-dihydroxyphenyl)-1-propyl]octamethylenediamine

N,N'-Bis[3-hydroxy-2-(3,4-dimethoxyphenyl)-1-propyl]octamethylenediamine is reacted in accordance with the process described in Example 1. M.P. of the dihydrobromide of the title compound: 66°–69°.

The starting material may be obtained as follows:
a. Crude oily N,N'-bis[2-carbethoxy-2-(3,4-dimethoxyphenyl)-1-ethyl]octamethylenediamine is produced in accordance with the process described in Example 1 (a) from 3,4-dimethoxyatropic acid ethyl ester and octamethylenediamine, and
b. N,N'-bis[3-hydroxy-2-(3,4-dimethoxyphenyl)-1-propyl]octamethylenediamine is obtained therefrom by reduction in a manner analogous to that described in Example 1 (b). M.P. 80°–82°.

EXAMPLE 6

N,N'-Bis[3-hydroxy-2-(3,4-dihydroxyphenyl)-1-propyl]decamethylenediamine

N,N'-Bis[3-hydroxy-2-(3,4-dimethoxyphenyl)-1-propyl]decamethylenediamine is reacted in accordance with the process described in Example 1. M.P. of the dihydrobromide of the title compound: 65°–70°.

The starting material may be obtained as follows:
a. Crude oily N,N'-bis[2-carbethoxy-2-(3,4-dimethoxyphenyl)-1-ethyl]decamethylenediamine is produced in a manner analogous to that described in Example 1 (a) from 3,4-dimethoxyatropic acid ethyl ester and decamethylenediamine, and
b. N,N'-bis[3-hydroxy-2-(3,4-dimethoxyphenyl)-1-propyl]decamethylenediamine is obtained therefrom by reduction in a manner analogous to that described in Example 1 (b). M.P. 70°–74°.

EXAMPLE 7

1,4-Bis{2-[3-hydroxy-2-(3,4-dihydroxyphenyl)-1-propylamino]ethyl}benzene 1,4-Bis{2-[3-hydroxy-2-(3,4-dimethoxyphenyl)-1-propylamino]ethyl}benzene is reacted in accordance with the process described in Example 1. M.P. of the dihydrobromide of the title compound: 78°.

The starting material may be obtained as follows:
a. 1,4-Bis{2-[2-carbethoxy-2-(3,4-dimethoxyphenyl)-1-ethyl]ethyl}benzene is produced in a manner analogous to that described in Example 1 (a) from 3,4-dimethoxyatropic acid ethyl ester and 1,4-bis(2-aminoethyl)benzene (M.P. of the dihydrochloride: 106°–110°), and
b. 1,4-bis{2-[3-hydroxy-2-(3,4-dimethoxyphenyl)-1-propylamino]ethyl}benzene is obtained therefrom by reduction in a manner analogous to that described in Example 1 (b). M.P. 112°.

EXAMPLE 8

N,N'-Bis[3-hydroxy-2-(3,4-dihydroxyphenyl)-1-propyl]hexamethylenediamine 5.0 g of N,N'-bis[3-hydroxy-2-(3,4-dibenzyloxyphenyl)-1-propyl]hexamethylenediamine are dissolved in 100 cc of methanol, and after the addition of 0.2 g of palladium on charcoal hydrogenation is effected at 40° and a hydrogen pressure of 6 atmospheres. After 4 hours the catalyst is filtered off and the filtrate is concentrated by evaporation. The resulting title compound is converted into the dihydrobromide with hydrobromic acid in ethanol, and the dihydrobromide is recrystallized from ethanol/ether. M.P. of the dihydrobromide of the title compound: 86–88°.

The starting material may be obtained as follows:

a. α-(3,4-Dibenzyloxyphenyl)acrylic acid ethyl ester and 1,6-diaminohexane are reacted in a manner analogous to that described in Example 1 (a) to obtain N,N'-bis[2-carbethoxy-2-(3,4-dibenzyloxyphenyl)-1-ethyl]hexamethylenediamine (thick oil, which is used for the next reaction without purification), and b. N,N'-bis[3-hydroxy-2-(3,4-dibenzyloxyphenyl)-1-propyl]hexamethylenediamine is produced therefrom by reduction in a manner analogous to that described in Example 1 (b). The crude product is obtained as resinous substance and is used for the next reaction without purification.

What is claimed is:

1. A compound of the formula:

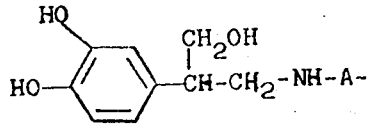

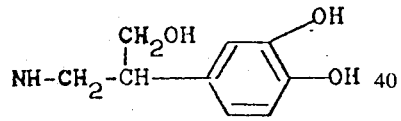

wherein A is a $-(CH_2)_n-$ group,
wherein $n$ is an integer from 2 to 10, or a

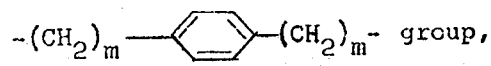

wherein $m$ is 2,
or a pharmaceutically acceptable acid addition salt thereof.

2. The compound of claim 1, which is N,N'-Bis[3-hydroxy-2-(3,4-dihyroxyphenyl)-1-propyl]hexamethylenediamine.

3. The compound of claim 1, which is N,N'-Bis[3-hydroxy-2-(3,4-dihydroxyphenyl)-1-propyl]tetramethylenediamine.

4. The compound of claim 1, which is N,N'-Bis[3-hydroxy-2-(3,4-dihydroxyphenyl)-1-propyl]ethylenediamine.

5. The compound of claim 1, which is N,N'-Bis[3-hydroxy-2-(3,4-dihydroxyphenyl)-1-propyl]trimethylenediamine.

6. The compound of claim 1, which is N,N'-Bis[3-hydroxy-2-(3,4-dihydroxyphenyl)-1-propyl]octamethylenediamine.

7. The compound of claim 1, which is N,N'-Bis[3-hydroxy-2-(3,4-dihydroxyphenyl)-1-propyl]decamethylenediamine.

8. The compound of claim 1, which is 1,4-Bis{2-[3-hydroxy-2-(3,4-dihydroxyphenyl)-1-propylamino]ethyl}benzene.

* * * * *